United States Patent Office 3,420,735
Patented Jan. 7, 1969

3,420,735
WET-STRENGTH RESINS AND A PROCESS FOR IMPROVING THE WET-STRENGTH OF PAPER
John S. Conte, Media, and Robert W. Faessinger, Ridley Park, Pa., assignors to Scott Paper Company, Delaware County, Pa., a corporation of Pennsylvania
No Drawing. Continuation-in-part of applications Ser. No. 396,698, Ser. No. 396,712, Ser. No. 396,713, Ser. No. 396,740, Sept. 15, 1964. This application Mar. 31, 1967, Ser. No. 627,307
U.S. Cl. 162—167    14 Claims
Int. Cl. D21h 3/32

ABSTRACT OF THE DISCLOSURE

Water-soluble, cationic, thermosetting resins prepared from (a) a dicarboxylic acid, (b) a polyalkylene polyamine, (c) either urea or an inorganic acid and an alkali metal cyanate, and (d) formaldehyde. These resins may be used in treating paper to impart thereto improved wet-strength properties.

CROSS REFERENCES TO RELATED APPLICATIONS

This application is a continuation-in-part of copending applications Ser. Nos. 396,698; 396,712; 396,713 and 396,740; all of which were filed on Sept. 15, 1964, all now abandoned.

BACKGROUND OF THE INVENTION

Field of the invention

This invention relates novel water-soluble, cationic, thermosetting, resinous compositions, to a process for preparing said compositions, to a process for treating paper with said compositions to improve the wet-strength thereof, and to the wet-strengthened paper product. More particularly, this invention relates to water-soluble, cationic, thermosetting, resinous compositions prepared from (a) a dicarboxylic acid, (b) a polyalkylene polyamine, (c) either urea of an inorganic acid and an alkali metal cyanate, and (d) formaldehyde; and to wet-strengthened paper which has been treated with said resinous compositions.

DESCRIPTION OF THE PRIOR ART

There are numerous compositions somewhat similar to the resins of the present invention disclosed in the prior art, but these prior art resins have been produced by reacting different starting materials in either the same or different proportions. Although these prior art compositions are of a resinous nature, there are many physical and chemical differences which set them apart from each other, and from the compositions of the present invention. The use of the prior art resins for wet-strength purposes has been suggested in many instances; however, many of these resins either are so different in their physical and chemical properties as to make them unusable as wet-strength resins, or they have failed to display the acceptable properties which are needed in wet-strength applications. These different prior art compositions are well represented in the patent art, and are recognized by those skilled in the art in the pulp and paper industry.

SUMMARY OF THE INVENTION

The resinous compositions of this invention are prepared by reacting a polyalkylene polyamine and a dibasic acid in an aqueous solution and in a mole ratio of from 0.8:1.0 to about 1.4:1.0 to produce a high molecular weight condensation product. A mole ratio of from about 0.9:1.0 to about 1.15:1.0 is preferred. The resulting high molecular weight polyaminopolyamide condensation product is then either reacted with urea in a mole ratio of from about 0.6 to about 1.5 moles per mole of reactive amine, or is converted to a salt with an inorganic acid and then reacted with an alkali metal cyanate in a mole ratio of from about 0.6 to about 1.5 moles per mole of reactive amine. Mole ratios of from about 0.8 to about 1.2 moles of urea or alkali metal cyanate per mole of reactive amine are preferred. The resulting polyureide reaction product is then converted to its thermosetting form by reacting it with formaldehyde. This thermosetting resinous composition is water-soluble, and may be employed in the preparation of cellulosic webs, such as paper, to improve the wet-strength of said cellulosic webs by improving the bonding of the cellulosic fibers together, the improvement in bonding being due to the presence of the water-soluble, wet-strength resin.

DESCRIPTION OF THE PREFERRED EMBODIMENTS

Suitable dicarboxylic acids which may be employed in the preparation of the resins of this invention are, in general, saturated aliphatic dicarboxylic acids having from 3 to 8 carbon atoms, such as malonic, succinic, glutaric, adipic and the like, together with diglycolic acid and dithioglycolic acid. However, the preferred dicarboxylic acids are diglycolic acid, dithioglycolic acid, and the saturated dicarboxylic acids having from 4 to 6 carbon atoms in the molecule. Blends of the two or more of these dicarboxylic acids may also be used along with the higher saturated aliphatic dicarboxylic acids such as azelaic and sebacic as long as the resulting high molecular weight polyamide is water-soluble or at least water dispersible.

The polyalkylene polyamines suitable for this invention are represented by the general formula

$$NH_2(RNH)_nH$$

where R is an alkylene group of 2 to 8 carbon atoms, but preferably up to about four, and $n$ is an integer from 2 to 5. Polyalkylene polyamines which may be employed in this invention are the polyethylene polyamines, polypropylene polyamines, polybutylene polyamines, such as diethylene triamine, triethylene tetraamine, tetraethylene pentamine, dipropylenetriamine and the like, of which the polyethylene polyamines represent the preferred class.

The alkali metal cyanates which may be used in this invention are lithium cyanate, sodium cyanate, potassium cyanate, sodium thiocyanate, potassium thiocyanate, and the like. Blends of two or more of the above metal cyanates may also be employed.

The preparation of the novel resinous compositions of this invention is carried out in either three or four steps depending on whether the polyureide intermediate is formed by reacting the polyaminopolyamide reaction product with urea, or whether said intermediate is formed by initially converting the polyaminopolyamide to the salt of said polyaminopolyamide and an inorganic acid, said salt then being reacted with an alkali metal cyanate to form the polyureide intermediate. In either instance, however, the first-stage reaction which is between the polyalkylene polyamine and the dicarboxylic acid is carried out in an aqueous medium and at a temperature ranging from about 110° C. to about 250° C. For most purposes, however, temperatures between about 160° C. and 210° C. are preferred, and where reduced pressures are employed, somewhat lower temperatures may be used. The reaction is continued within this temperature range from about ½ to 2 hours depending on the pressures utilized. However, shorter or longer reaction time may be used depending on the reaction conditions such as pressure and temperature. In general, the above reaction is carried out to completion.

When the polyureide intermediate is formed by reacting the polyaminopolyamide condensation product of step one with urea, the second step in the process consists of heating a concentrated solution of said polyaminopolyamide with urea, pressure being used if necessary to effect the desired reaction. Alternatively, this reaction can be performed by driving off solvent from the said polyaminopolyamide, and then fusing it with urea. Ammonia is liberated and is taken off. Absorption of the ammonia provides a convenient way to follow the reaction.

The reaction of urea and polyaminopolyamide is carried out at temperatures between 100° C. and 200° C., the temperature being sufficient to cause evolution of ammonia. The evolution of ammonia begins between 100° C. to 110° C. and continues slowly at this level. Raising the temperature considerably accelerates the reaction. A temperature range of 100° C. to 150° C. is preferred.

In general, about one mole of urea per reactive —NH— group of the polyaminopolyamide is used. Somewhat less than one mole of urea may, however, be used, with —NH— groups remaining in the product, but a marked deficiency of urea allows side reaction to occur. Excess urea does no harm, remaining for the most part in the reaction mixture. It is preferred to use from about 0.6 to 1.5 moles of urea per —NH— group of said polyaminopolyamide, with from about 0.8 mole to about 1.5 moles urea per mole of reactive amine being particularly preferred.

The desired type of product at this stage is obtained when one collects about 70-100% of the theoretical amount of ammonia but preferably 90%.

When the polyureide intermediate is formed by converting the polyaminopolyamide condensation product of the first-stage reaction to the salt of said polyaminopolyamide and an inorganic acid, said salt subsequently being reacted with an alkali metal cyanate to form the polyureide intermediate, the second stage in the process consists of forming the complete salt of the polyaminopolyamide described herein above. In this step, sufficient amounts of a strong water-soluble, preferably inorganic acid such as hydrochloric, sulfuric, hydrobromic, hydroiodic and the like are added to form the salt of the polyaminopolyamide. By employing a sufficient amount of the acid, the complete polyaminopolyamide salt is thus formed.

When the polyureide intermediate is formed by converting the polyaminopolyamide to its inorganic acid salt and then reacting this salt with an alkali metal cyanate to form the polyureide intermediate, the third stage in the process consists of converting the polyaminopolyamide salt to the polyureide derivative by reacting the polyaminopolyamide salt with a water-soluble metal cyanate or water-soluble metal thiocyanate in an aqueous solution. The alkali metal compounds which may be employed in this invention are those mentioned above or mixtures thereof. However, the preferred alkali metal compounds are the cyanates and thiocyanates of lithium, sodium and potassium. The amount of the alkali metal cyanate or thiocyanate that is reacted with the polyaminopolyamide salt is based on the number of reactive amine groups contained in said salt. One may use from about 0.6 to 1.5 moles but preferably from about 0.8 to 1.2 moles of the alkali metal cyanate or thiocyanate per mole of reactive amine groups contained in the polyaminopolyamide salt. An amount greater than 1.5 moles of alkali metal cyanate or thiocyanate per mole of reactive amino groups in the salt may be employed, if desired, but no advantages are thereby realized. The reaction between the polyaminopolyamide salt and the alkali metal cyanate or thiocyanate is exothermic and the reaction is complete when the exotherm or exothermic heat of reaction ceases. In general, this reaction occurs at temperatures from about 25° C. to the reflux temperature of the mixture. Preferably, however, it is carried out between about 50° C. and about 80° C. from about 5 minutes to about 1 hour depending on the temperature employed. The reaction does not cause any cross-linking; therefore, there is little danger of gelation in this step.

The final stage in the formation of the novel resinous compositions of our invention is the reaction of formaldehyde with the polyureide formed above to form the methylol derivative. While it is preferred to employ formaldehyde for this purpose, other compounds engendering formaldehyde, such as paraformaldehyde and trioxane, may be employed. The amount of the formaldehyde used should be at least sufficient to form a thermosetting resin and that amount is based on the moles of urea, cyanate or thiocyanate added to the polyaminopolyamide reaction mixture. Thus, from about 1:1 to about 3:1 or more moles of formaldehyde per mole of urea, cyanate or thiocyanate should be introduced into the reaction mixture. An excess of formaldehyde is normally added if the formaldehyde-polyureide condensation is performed in an acid medium in order to prevent gelation and to stablize the resinous end product. This reaction is carried out at a neutral, acid or alkaline pH, the object being to obtain a water-soluble resin which will be an efficient thermosetting wet-strength agent at an acid pH. The formaldehyde-polyureide condensation reaction is carried out at from room temperature up to and including the reflux temperature of the mixture. Although the reaction can take place at room temperature, it proceeds faster at elevated temperatures from about 60-90° C., for about 10 to 180 minutes, preferably for about 30 to about 150 minutes. In order to obtain an efficient wet-strength agent, it may be necessary to continue this condensation further; this is accomplished by performing the reaction at a pH between 3.5 to 5.5 but preferably 4 to 4.5 and in an excess of formaldehyde until the resin solution changes to a viscous syrup at a point of incipient gelation (freezing), and then stopping the reaction by diluting with water and/or formaldehyde and adjusting the pH between 7.0 to 7.5 with base. The acid-medium above is obtained by adding an organic or inorganic acid such as sulfuric, hydrochloric, phosphoric, formic, acetic acid and the like.

The final condensate constitutes the novel product of this invention and may be prepared for use by diluting with water to a desired resin solids content. The aqueous solutions of these novel resinous products are cationic and are completely clear, although they may be straw-like in color.

The resinous compositions of this invention are water-soluble, and may be employed in the preparation of cellulosic webs, such as paper, paperboard, molded paper, pulp articles and the like to improve the wet-tensile strength by bonding the cellulosic fibers together, due to the presence of said novel resins. Further, these novel resins find employment in the treatment of textiles, cellophane and the like. These compositions may also be employed in molding and laminating operations, and may also be useful in the field of adhesives.

In order to describe the present invention so that it may be more clearly understood, the following examples are set forth in which all parts are expressed in grams by weight unless otherwise stated. These examples are set forth primarily for the purpose of illustration, and any specific enumeration of detail contained therein should not be interpreted as a limitation on the broad concept of this invention.

Example A

One hundred and thirteen grams (1.09 moles) of diethylenetriamine and 50 grams of water were placed in a 3-neck flask equipped with a mechanical stirrer, thermometer and condenser. To this were added 145 grams (1.0 mole) of adipic acid. The mixture was heated to 185–200° C. and held there for 1¾ hours. Then vacuum from a water pump was applied to the flask during the period required for the contents of the flask to cool to 140° C. following which 215 grams of water were added. The polyaminopolyamide solution contained 52.3% solids.

To 120 grams of the above polyaminopolyamide were added 50 grams of water and 10 grams of urea. The mixture was heated at 120° C. until 5 grams of ammonia were collected. The polyureide was cooled to 70° C. following which 100 ml. of water and 67 grams of 37% formaldehyde were added. The solution was then adjusted to a pH of 4.0 with 10% hydrochloric acid and heated at 70–75° C. for 1 hour. The resulting solution was neutralized with 10% sodium hydroxide to yield a resin containing 21.9% solids.

Example B

A polyaminopolyamide was prepared from 112.5 grams (1.09 moles) of diethylene-triamine and 109 grams (0.75 mole) of adipic acid and 47 grams (0.25 mole) azelaic acid according to Example A. The polymeric solution contained 55.0% solids.

To 253 grams of this polymer were added 36.5 grams of urea. The mixture was heated at 120° C. until 10.4 grams of ammonia had been given off. At this point, 200 grams of water were added to give a solution containing 34.3% solids.

To 88 grams of this polyureide were added 120 grams of water and 60 grams of 37% formaldehyde. The mixture was stirred at room temperature until the solution changed to a viscous syrup. At this point, 20 ml. of formaldehyde were added and the stirring continued to insure complete mixing of the formaldehyde into the resin syrup. The resulting solution was adjusted to a pH of 7.5 with 10% sodium hydroxide and diluted with water to yield a resin containing 12.1% solids.

Example C

To a mixture consisting of 207.5 grams (1.1 moles) of tetraethylene pentamine and 50 grams of water which were heated to 120° C. were added 132.5 grams (0.91 mole) adipic acid over a period of 25 minutes. The mixture was heated to 170–175° C. for 2 hours, cooled to 140° C. and 250 grams of water were added. The polymeric solution contained 56.6% solids.

To 162 grams of the above polyaminopolyamide were added 60 grams of urea. The mixture was heated at 110° C. until 16 grams of ammonia had been given off. At this point, 200 grams of water were added to give a solution containing 41.5% solids.

To 83 grams of this polyureide were added 49.5 grams of 37% formaldehyde. The mixture was heated at 70–75° C. for 30 minutes. The resulting solution was adjusted to a pH of 7.2 with 10% hydrochloric acid and diluted with 30 ml. of water to yield a resin containing 24.1% solids.

Example D

A polyaminopolyamide was prepared from 183 grams (1.25 moles) of triethylenetetramine and 118 grams of succinic acid according to Example A. The polyaminopolyamide solution contained 54.7% solids.

To 242 grams of the above polyaminopolyamide were added 60 grams of urea and the mixture was heated to 125° C. until 16 grams of ammonia were given off. At this point, 75 grams of water were added to give a solution containing 63.7% solids.

To 81 grams of the above polyureide were added 50 grams of water and 40.4 grams of 37% formaldehyde. The mixture was adjusted to a pH of 4.1 with 10% hydrochloric acid and was heated at 70–75° C. for 1 hour. The resulting solution was diluted with 100 grams of water and adjusted to a pH of 7.2 with 10% sodium hydroxide. The polyureide-formaldehyde condensate contained 19.2% solids.

Example E

A polyamide was prepared from 159.5 grams (1.09 moles) of triethylenetetramine and 145 grams (1.0 mole) of adipic acid according to the procedure described in Example A. This polyaminopolyamide solution contained 49.8% solids.

To 175 grams of the above polyaminopolyamide were added 50 grams of urea and the mixture was then heated to 100–110° C. with the evolution of ammonia. When 12.8 grams of ammonia were collected, 100 grams of water were added to the mixture to yield a condensate containing 57.0% solids.

To 65.6 grams of the above polyureide were added 48.5 grams of 37% formaldehyde and the mixture was heated to 70–75° C. for ½ hour yielding a resin containing 35.6% solids.

Example F

One hundred and thirteen grams (1.09 moles) of diethylenetriamine and 50 grams of water were placed in a 3-neck flask equipped with a mechanical stirrer, thermometer and condenser. To this was added 145 grams (1.0 mole) of adipic acid. The mixture was heated to 185–200° C. and held there for 1¾ hours. Then vacuum from a water pump was applied to the flask during the period required for the contents of the flask to cool to 140° C. following which 215 grams of water were added. The polyaminopolyamide solution contained 52.3% solids.

To 61.6 grams of the above polymer were added 16.0 grams of 37.5% hydrochloric acid and 38.4 grams of water. To this were added 10.0 grams of potassium cyanate and the mixture was heated to 70–75° C. for 1 hour. Thirty-three grams of 37% formaldehyde were added and the heating continued until the resin solution changed to viscous syrup. At this point 20 grams of formaldehyde were added and stirring continued for 5 minutes to insure complete mixing of the formaldehyde into the resin syrups. The resulting solution was neutralized to pH of 7.0 with 10% sodium hydroxide and diluted with 100 grams of water to yield a resin containing 18.7% solids.

Example G

A polyaminopolyamide was prepared from 112.5 grams (1.09 moles) of diethylenetriamine and 109 grams (0.75 mole) of adipic acid and 47.0 grams (0.25 mole) azelaic acid according to Example F. To 63 grams of the polyaminopolyamide solution containing 55.0% solids were added 17.0 grams of 37.5% hydrochloric acid followed by ten grams of potassium cyanate and an exothermic reaction developed. The reaction mixture was kept at 70–75° C. for 30 minutes. One hundred grams of water and 20 grams of 37% formaldehyde were added. The pH of the system was acid. The reaction mixture was maintained at 70–75° C. until the resin solution changed to a viscous syrup. At this point, 150 grams of water were added and the resulting solution was adjusted to pH of 7.2 with 20 grams of 10% sodium hydroxide. The product contained 12.7% resin solids.

Example H

To a mixture consisting of 207.5 grams (1.1 moles) of tetraethylene pentamine and 50.0 grams of water which were heated to 120° C. were added 132.5 grams (0.91 mole) adipic acid over a period of 25 minutes. The mixture was heated to 170–175° C. for 2 hours, cooled to 140° C. and 250 grams of water were added. The polymeric solution contained 56.6% solids.

Eighty grams of this polyaminopolyamide were diluted with 236 grams of water and completely neutralized with 51.0 grams of 37.5% hydrochloric acid. To this amine salt were added 37.2 grams of potassium cyanate which initiated an exothermic reaction. The mixture was heated at 70–75° C. for 30 minutes. To this condensate, 112.0 grams of 37% formaldehyde were added and the reaction mixture was maintained at 70° C. for 1 hour. The resulting syrup contained 23.2% solids.

Example I

A polyaminopolyamide was prepared from 183.0 grams (1.25 moles) of triethylenetetramine and 118.0 grams of succinic acid according to Example F. The polyaminopolyamide solution contained 54.7% solids.

To 71.5 grams of this polymer were added 28.5 grams of water and 32.0 grams of 37.5% hydrochloric acid. To this amine salt were added 24.8 grams of potassium cyanate and the mixture was heated at 70–75° C. for 30 minutes. To this condensate 102.5 grams of 37% formaldehyde were added and the mixture adjusted to a pH of 4.0 with 35 grams of 10% hydrochloric acid. The heating was continued until the resin solution changed to a viscous syrup. At this point, 20 grams of 37% formaldehyde were added and stirring continued for a few minutes to insure complete mixing of the formaldehyde into the resin syrup. The resulting solution was diluted with 150 grams of water and adjusted to a pH between 7–7.5 with 35 ml. of 10% sodium hydroxide. The product contained 18.6% solids.

Example J

A polyamide was prepared from 159.5 grams (1.09 moles) of triethylenetetramine and 145 grams (1.0 mole) of adipic acid according to the procedure described in Example F.

To 78.0 grams of this polymer were added 29.4 grams of 37.5% hydrochloric acid, 57.0 grams of water, and 24.0 grams of potassium cyanate and then the mixture was heated to 70–75° C. for 30 minutes. To this condensate was added 72.5 grams of 37% formaldehyde, and heating was continued (70–75° C.) for 1 hour. The product containing 32.2% solid was cooled to room temperature.

As mentioned above, the novel resins impart improved wet-strength to cellulosic sheeting when reacted with cellulose under acidic conditions.

This resin is a beater-additive type of wet-strength producing resin; however, it may also be used to impregnate the paper sheet by immersion, spraying, etc., following which the paper sheet may be further processed to cure the resin. Normally, the resin is self-curing and no extra treating step is needed.

This resin is preferably incorporated into pulp by adding it to aqueous suspensions of paper stock or furnish in the beater stock chests, Jordan engine, fan pump, headbox or at any other suitable point ahead of the wire or sheet-forming stage.

An advantageous amount of resin added to the paper sheet constitutes about 0.1% to 10.0% resin solids based on the dry weight of paper. A range of from about 0.1% to about 5% is preferred. However, the amount may be varied to suit the particular need.

Paper and pulp slurries having a pH below about 7 may be effectively treated with the novel resin.

Representative data obtained by using the novel resins in accordance with the above examples are illustrated in the following table:

| Example | Percent of resin added based on bone-dry pulp | Wet tensile, oz./in. | Dry tensile, oz./in. | Percent wet tensile, dry tensile |
| --- | --- | --- | --- | --- |
| A | 1 | 53.8 | 164.3 | 32.7 |
| B | 1 | 38.5 | 172.9 | 22.4 |
| C | 1 | 69.9 | 189.3 | 36.9 |
| D | 1 | 53.8 | 185.3 | 29.0 |
| E | 1 | 45.8 | 121.3 | 37.7 |
| F | 1 | 59.5 | 184.2 | 32.3 |
| G | 1 | 48.3 | 153.1 | 30.8 |
| H | 1 | 66.5 | 173.4 | 38.3 |
| I | 1 | 61.0 | 183.5 | 33.4 |
| J | 1 | 42.5 | 165.0 | 25.7 |
| Control | 0.0 | 3.0 | | |

Sheets tested according to the examples above were prepared on a Noble and Wood Handsheet machine from bleached West-Coast sulfite pulp having a Canadian freeness of 450 cc. The pulp slurry was adjusted to a pH of 4.0 with sulfuric acid. The sheets were oven cured for 30 minutes at 110° C. and conditioned before measurements were made on a Thwing-Albert Tensile tester according to the standard TAPPI method T 456m–49.

Other examples can be run in the same or similar manner as those above. In place of the illustrated reactants any of the other reactants may be used as the reaction proceeds in a similar manner from that illustrated above. For example, the various acids may be substituted in place of those shown in the examples; likewise, other alkali cyanates may be used.

What is claimed is:
1. A process for preparing a water-soluble, cationic, resinous composition which is thermosetting at an acid pH which comprises the steps of:
 (a) reacting in an aqueous medium and at a temperature of from about 110° C. to about 250° C.,
  (1) a member of the group conesisting of saturated aliphatic dicarboxylic acids having from 3 to 8 carbon atoms, diglycolic acid, dithioglgycolic acid, and mixtures of said acids with (2) at least one member of the group consisting of polyalkylene polyamines of the formula

$$H_2N(RNH)_nH$$

wherein R is an alkylene group having from 2 to 8 carbon atoms, and $n$ is an integer of from 2 to 5, said polyalkylene polyamine and said acid being reacted in a mole ratio of from about 0.8:1.0 to about 1.4:1.0;
 (b) forming a polyureide intermediate of the polyaminopolyamide condensation product of step (a) by reacting said condensation product with urea at a temperature of from about 100° C. to about 200° C. and in a mole ratio of from about 0.6 mole to about 1.5 moles of urea per mole of reactive amine in said condensation product, and
 (c) reacting the polyureide intermediate of step (b) with at least one formaldehyde yielding material selected from the class consisting of formaldehyde, paraformaldehyde and trioxane at a temperature of from about room temperature up to and including the reflux temperature of the reaction mixture, said formaldehyde yielding material being present in an amount which is equivalent to from about 1 mole of formaldehyde to about 3 moles of formaldehyde per mole of urea employed in step (b).

2. A process as claimed in claim 1, wherein the acid employed in step (a) is selected from the class consisting of saturated aliphatic dicarboxylic acids having from 4 to 6 carbon atoms, diglycolic acid, dithioglycolic acid and mixtures of said acids; the polyalkylene polyamine employed in step (a) is a polyamine wherein R is an alkylene group of 2 to 4 carbon atoms; the polyalkylene polyamine and the acid employed in step (a) are reacted at a temperature of from about 160° C. to about 210° C. and in a mole ratio of from about 0.9:1.0 to about 1.15:1.0; the urea employed in step (b) is present in a mole ratio of from about 0.8 mole to about 1.2 moles per mole of reactive amine in the polyaminopolyamide condensation product of step (a); the reaction in step (b) is conducted at a temperature of from about 100° C. to about 150° C. until from about 70% to about 100% of the theoretical amount of the ammonia which is also formed during this reaction step has evolved; the formaldehyde yielding material employed in step (c) is formaldehyde; and the reaction in step (c) is conducted at a temperature of from about 60° C. to about 90° C. for a period from about 10 to about 180 minutes.

3. A process as claimed in claim 2, wherein the reaction in step (b) is continued until at least about 90% of the theoretical amount of the ammonia which is also formed during this reaction step has evolved; the reaction in step (c) is conducted for a period of from about 30 to about 150 minutes; and wherein the process comprises the additional steps of: (d) continuing, in the presence of an excess of formaldehyde and at a pH of from about 3.5 to about 5.5, the reaction of step (c) until the reaction mixture reaches the point of incipient gelation; and (e) stopping the reaction by adjusting the pH of the reaction mixture to a pH of from about 7.0 to about 7.5 with a base and diluting the reaction mixture with a diluent selected from the class consisting of water, formaldehyde, and a mixture of formaldehyde and water.

4. A process for preparing a water-soluble, cationic, resinous composition which is thermosetting at an acid pH which comprises the steps of:
(a) reacting in an aqueous medium and at a temperature of from about 110° C. to about 250° C.,
 (1) a member of the group consisting of saturated aliphatic dicarboxylic acids having from 3 to 8 carbon atoms, diglycolic acid, dithioglycolic acid, and mixtures of said acids with
 (2) at least one member of the group consisting of polyalkylene polyamines of the formula $$H_2N(RNH)_nH$$

wherein R is an alkylene group having from 2 to 8 carbon atoms, and $n$ is an integer of from 2 to 5, said polyalkylene polyamine and said acid being reacted in a mole ratio of from about about 0.8:1.0 to about 1.4:1.0;
(b) forming a polyureide intermediate of the polyaminopolyamide condensation product of step (a) by
 (3) converting said condensation product to the inorganic acid salt thereof through the use of an inorganic acid, and then
 (4) reacting said salt with at least one compound selected from the class consisting of alkali metal cyanates, alkali metal thiocyanates, and a mixture of an alkali metal cyanate and an alkali metal thiocyanate, said salt being reacted with said compound at a temperature of from about 25° C. to about the reflux temperature of the reaction mixture and in a mole ratio of from about 0.6 mole of said compound to about 1.5 moles of said compound per mole of reactive amine in said condensation product, and
(c) reacting the polyureide intermediate of step (b) with at least one formaldehyde yielding material selected from the class consisting of formaldehyde, paraformaldehyde and trioxane, at a temperature of from about room temperature up to and including the reflux temperature of the reaction mixture, said formaldehyde yielding material being present in an amount which is equivalent to from about 1 mole of formaldehyde to about 3 moles of formaldehyde per mole of the compound which is reacted with the inorganic acid salt of the condensation product of step (a) to form the polyureide intermediate in step (b).

5. A process as claimed in claim 4, wherein the acid in step (a) is selected from the class consisting of saturated aliphatic dicarboxylic acids having from 4 to 6 carbon atoms, diglycolic acid, dithioglycolic acid, and mixtures of said acids; the polyalkylene polyamine employed in step (a) is a polyamine wherein R is an alkylene group of 2 to 4 carbon atoms; the polyalkylene polyamine and the acid employed in step (a) are reacted at a temperature of from about 160° C. to about 210° C. and in a mole ratio of from about 0.9:1.0 to about 1.15:1.0; the compound which is reacted with the inorganic acid salt of the polyaminopolyamide condensation product in step (b) is present in a mole ratio of from about 0.8 mole to about 1.2 moles per mole of reactive amine in the polyaminopolyamide salt; the reaction of said compound with the polyaminopolyamide salt is conducted at a temperature of from about 50° C. to about 80° C.; the formaldehyde yielding material employed in step (c) is formaldehyde; and the reaction in step (c) is conducted at a temperature of from about 60° C. to about 90° C. for a period of from about 10 to about 180 minutes.

6. A proces as claimed in claim 5 wherein the reaction in step (c) is conducted for a period of from about 30 to about 150 minutes; and wherein the process comprises the additional steps of: (d) continuing, in the presence of an excess of formaldehyde and at a pH of from about 3.5 to about 5.5, the reaction of step (c) until the reaction mixture reaches the point of incipient gelation; and (e) stopping the reaction by adjusting the pH of the reaction mixture to a pH of from 7.0 to about 7.5 with a base and diluting the reaction mixture with a diluent selected from the class consisting of water, formaldehyde, and a mixture of formaldehyde and water.

7. The product of the process claimed in claim 1.

8. The product of the process claimed in claim 4.

9. A process for preparing cellulosic sheet material having improved wet-strength which comprises adding to the cellulosic fibers used in making said sheet material a water-soluble, cationic, resinous composition prepared according to the process claimed in claim 1; distributing said resinous composition in intimate contact with said fibers; forming a cellulosic sheet from said fibers; and then curing the resinous composition present in said sheet.

10. A process for preparing a wet-strengthened paper sheet which comprises adjusting the pH of an aqueous dispersion of pulp to a pH below 7; adding to said dispersion from about 0.1% to about 5% by weight of resin solids, based on the dry weight of the pulp, of a water-soluble, cationic, resinous composition prepared according to the process claimed in claim 3; intimately mixing said resinous composition into the aqueous dispersion of pulp; forming a paper sheet from the aqueous dispersion of pulp containing said resinous composition; and then curing the resinous composition present in the sheet to a water-insoluble state.

11. A process for preparing a wet-strengthened paper sheet which comprises adjusting the pH of an aqueous dispersion of pulp to a pH below 7; adding to said dispersion from about 0.1% to about 5% by weight of resin solids, based on the dry weight of the pulp, of a water-soluble, cationic, resinous composition prepared according to the process claimed in claim 6, intimately mixing said resinous composition into the aqueous dispersion of pulp; forming a paper sheet from the aqueous dispersion of pulp containing said resinous composition; and then curing the resinous composition present in the sheet to a water-insoluble state.

12. A process for preparing cellulosic sheet material having improved wet-strength which comprises adding to the cellulosic fibers used in making said sheet material a water-soluble, cationic, resinous composition prepared according to the process claimed in claim 4; distributing said resinous composition in intimate contact with said fibers; forming a cellulosic sheet from said fibers; and then curing the resinous composition present in said sheet.

13. A wet-strengthened paper product which comprises cellulosic fibers and a resin prepared according to the process claimed in claim 1.

14. A wet-strengthened paper product which comprises cellulosic fibers and a resin prepared according to the process claimed in claim 4.

References Cited

UNITED STATES PATENTS

| | | | |
|---|---|---|---|
| 2,371,997 | 3/1945 | Hoover et al. | 260——72 |
| 2,683,134 | 7/1954 | Davidson et al. | 162—167 X |
| 2,885,318 | 5/1954 | Jen et al. | 162—167 |
| 2,926,116 | 2/1960 | Keim | 162——164 |
| 2,948,652 | 8/1960 | Jen et al. | 162—166 |
| 3,006,896 | 10/1961 | Hurst et al. | 260—70 |
| 3,275,605 | 9/1966 | Eastes | 260—70 |

S. LEON BASHORE, *Primary Examiner.*

U.S. Cl. X.R.

117—139.5, 155, 161; 162—183; 260—70, 72